United States Patent [19]

Possis

[11] Patent Number: 4,889,077
[45] Date of Patent: Dec. 26, 1989

[54] AUTOMATIC PET FEEDER

[76] Inventor: Zinon C. Possis, 4801 Rolling Green Pkwy., Edina, Minn. 55436

[21] Appl. No.: 218,974

[22] Filed: Jul. 14, 1988

[51] Int. Cl.$^4$ .............................................. H01K 5/07
[52] U.S. Cl. .................................................. 119/51.11
[58] Field of Search .......................... 119/51.11, 51.13; 221/15, 82; 222/650, 144, 63

[56] References Cited

U.S. PATENT DOCUMENTS

| | | | |
|---|---|---|---|
| 1,151,711 | 8/1915 | Pfleeger | 221/82 |
| 1,680,130 | 8/1928 | Conner | 221/82 |
| 2,278,949 | 4/1942 | Sabin | 221/82 |
| 3,043,479 | 7/1962 | Gaukstern. | |
| 3,050,029 | 8/1962 | Appleton | 119/51.13 |
| 3,605,697 | 9/1971 | Szekely | 119/51.11 |
| 3,726,438 | 4/1973 | O'Rourke | 119/51.13 |
| 3,754,527 | 8/1973 | Jenkins. | |
| 3,995,767 | 12/1976 | Brindley et al. | 221/82 |
| 4,089,299 | 5/1978 | Suchowski. | |
| 4,256,058 | 3/1981 | Deakins. | |
| 4,296,710 | 10/1981 | Sillers, III. | |
| 4,485,765 | 12/1984 | Schwartz et al. | 119/51.13 |
| 4,526,134 | 7/1985 | Sapp | 119/51.13 |
| 4,763,810 | 8/1988 | Christiansen | 221/15 |
| 4,809,877 | 3/1989 | Albright | 221/82 |

Primary Examiner—Paul J. Hirsch
Attorney, Agent, or Firm—Burd, Bartz & Gutenkauf

[57] ABSTRACT

An animal feeder having a base mountable on a support containing an electric motor operable to rotate a shaft at a relatively slow speed. A food dispensing wheel having pockets for holding food is releasably mounted on the shaft. Rotation of the wheel by operation of the motor periodically dispenses food to a feeding location.

18 Claims, 3 Drawing Sheets

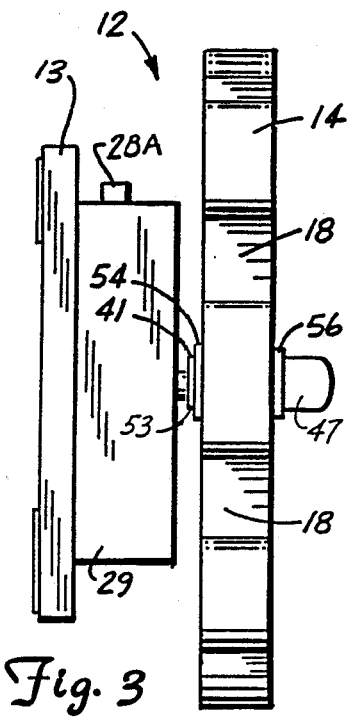
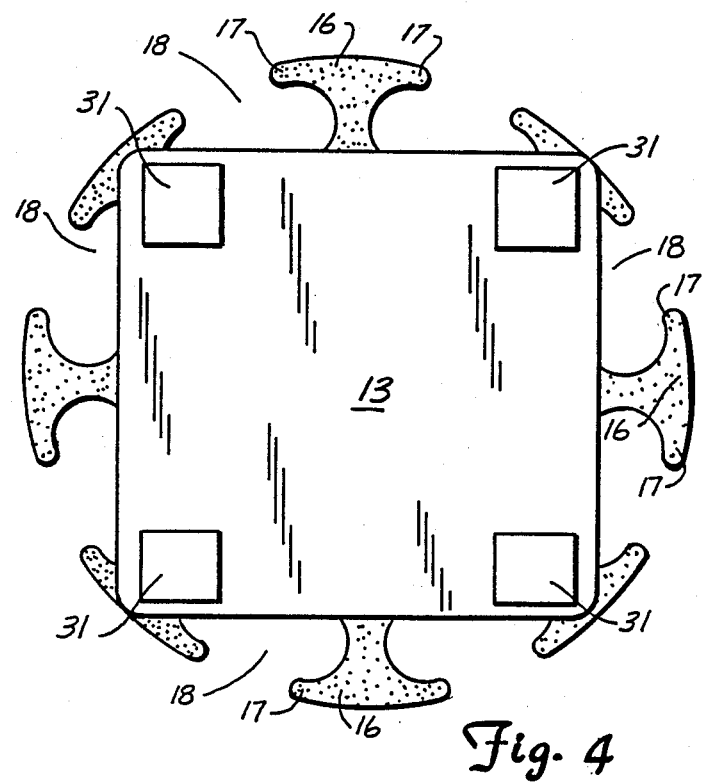
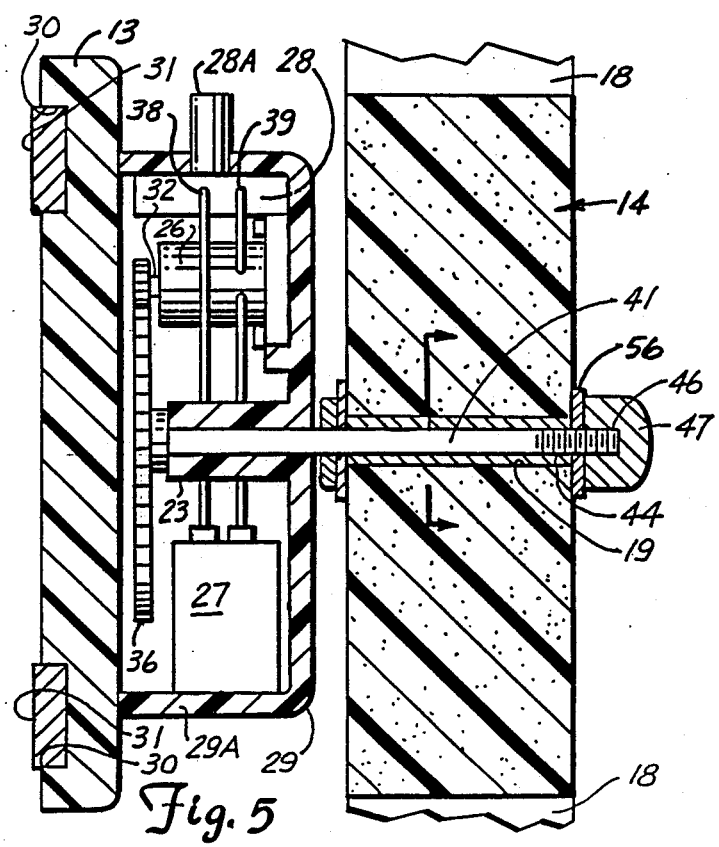
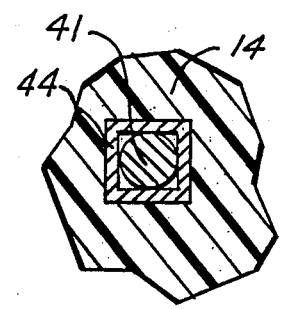
Fig. 3
Fig. 4
Fig. 5
Fig. 6

AUTOMATIC PET FEEDER

FIELD OF INVENTION

The invention relates to animal feeders for periodically dispensing food or rations to a location where they are accessible to an animal. The feeder is a portable apparatus that can be placed in a desired location and used to automatically dispense pet food onto a dish or feeding surface accessible by the pet animal.

BACKGROUND OF INVENTION

Feeding of pets, such as dogs, cats and the like is a daily chore of pet owners. Often the pet owners find it necessary to leave their pets unattended for long periods of time. Pet owners may have to terminate their activities in order to feed their pets. Other pet owners engage persons or obtain relatives and friends to feed their pets in the owners absence. This can be costly and inconvenient. Also the pet owner can inadvertantly forget a feeding of the pet. Engaging other persons to care for a pet does not insure that the pet will be fed properly and timely. The invention obviates these disadvantages by providing an automatic pet feeder that requires a minimum of human supervision and will dispense pet food or rations to a selected location for comsumption by the pet.

SUMMARY OF INVENTION

The invention is an automatic animal feeder operable to dispense animal food or rations into a dish or feeding location accessible to animals. The animals herein are referred to as human pets. Other animals may be fed by the feeder of the invention. The feeder also is usable to feed birds, reptiles, and fish. The feeder has a base adapted to be connected to a support. A housing mounted on the base encloses a drive shaft. Power means located within the housing are operable to rotate the drive shaft. The power means includes a small electric motor operably connected to a battery and a manually operated switch. A feeding wheel located outside of the base is non-rotatably secured to the drive shaft. The wheel has a plurality of pockets in its outer peripheral surface for accommodating animal food or rations. The wheel is located in a generally vertical plane so that the pet food in the upper pockets is retained in the wheel and the food in the lower pockets is dropped from the wheel to the feeding location. The motor when operated rotates the wheel so that the pockets will periodically move from the upper locations to lower locations to periodically dispense the pet food therefrom. The dispensing wheel is rotated at a relatively low speed so that the interval between dispensing of the pet food can be at a selected period of time, such as two or three hours.

A preferred embodiment of the feeder has a base carrying a plurality of magnets operable to support the feeder on a metal support in a selected position generally above the feeding location for the animal. A housing is secured to the base and encloses an electric motor connected to a power source, such as a DC battery. An on/off switch located within the housing has an external push actuator whereby the electric motor can be coupled to the power supply. A gear train operatively connects the battery with the drive shaft that accommodates this dispensing wheel. The housing has an enlarged hub that serves as a support bearing for the drive shaft. A drive shaft has an outer end portion that extends through a hole in the center of the wheel. A releasable fastener is used to couple the wheel to the shaft and enable the wheel to be removed for replacement and cleaning. The outer peripheral portion of the wheel has a plurality of circumferentially spaced pockets for accommodating animal food. Preferably the animal food is in pellet or nugget form. It can be carried in the pockets of the wheel. The wheel has a plurality of outwardly directed radial fingers. The outer portions of each finger has circumferentially directed lips that form an exit opening or mouth from the pockets. The lips confine the animal food to the pockets until the pockets are located in the lowermost portion of the wheel when the food drops to the feeding location. The electric motor is operable to slowly rotate the wheel so that the animal food will be periodically dispensed from the pockets. The amount and timing of the dispensing of the animal food can be controlled by the animal husbantrist.

DESCRIPTION OF DRAWING

FIG. 3 is a side view of the animal feeder of FIG. 2;

FIG. 4 is a rear view of the animal feeder of FIG. 2;

FIG. 5 is an enlarged sectional view taken along the line 5—5 of FIG. 3;

FIG. 6 is an enlarged sectional view taken along the line 6—6 of FIG. 5;

DESCRIPTION OF PREFERRED EMBODIMENTS

Figure 1:
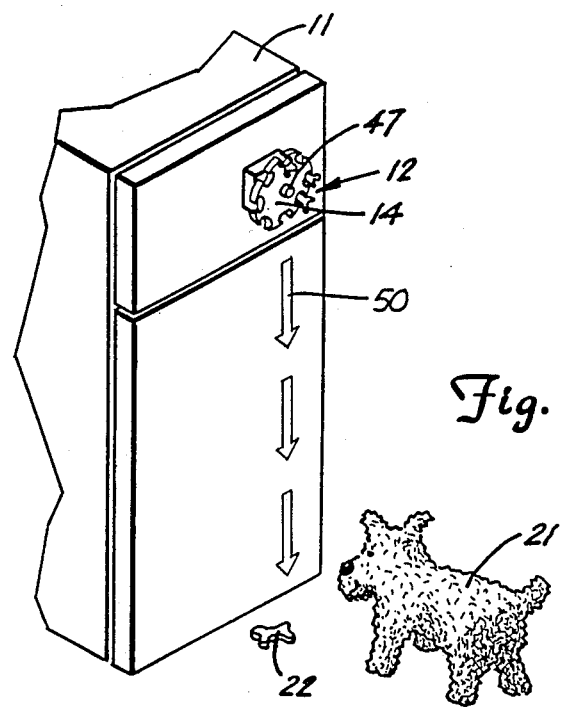
FIG. 1 is a perspective view of an upright support holding the animal feeder of the invention.

Referring to FIG. 1, there is shown the animal feeder the invention indicated generally at 12 for automatically providing food or pet treats 22 to an animal 21, shown as a pet dog. Feeder 12 can be used to feed other animals including cats. Feeder 12 is mounted on at an elevation above the floor having a feeding surface. A dish or tray can be placed on the surface to receive the food 22. Food 22 is a commercial product that is sold in pellet form having a circular, bone shape, triangular, and other shapes. The food can have one or more flavors such as beef, cheese, liver, bacon, and chicken. Feeder 12 is shown mounted on an upper door of a refrigerator 11. Feeder 12 can also be mounted on other fixtures such as a wall, door, cabinet, and other structures that are located in the feeding area of the animal 21. Feeder 12 functions to automatically dispense food 22 at predetermined times as herein described.

Figure 2:
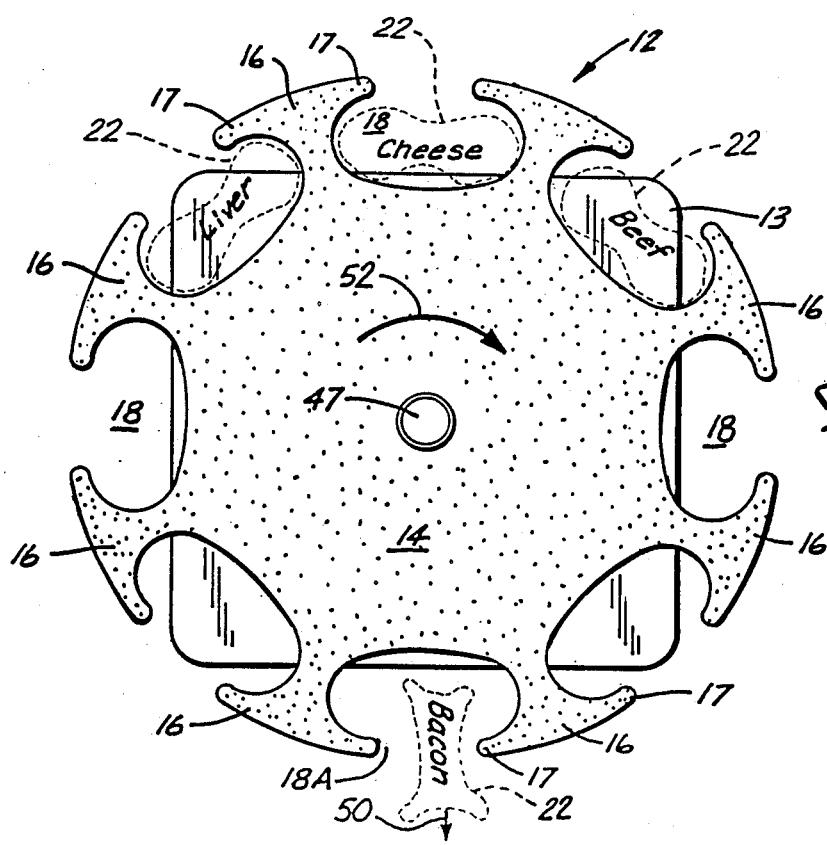
FIG. 2 is an enlarged front view of the animal feeder of the invention.

As shown in FIGS. 2 and 3, feeder 12 has a generally rectangular base 13 supporting a food dispensing wheel or disc 14. Base 13 is a generally rectangular rigid member having rounded corners. Each corner of the back side of the base has a square recess which accommodates square magnets 31. As shown in FIGS. 4 and 5 the magnets 31 project rearwardly from the back of base 13 and fit with tight fit in recesses 30. Magnets 31 hold feeder 12 on the metal door of refrigerator 11. Magnets can be used to releaseably hold feeder 12 on other metal supports. Other means, such as male-female connectors, Velcro fasteners, nails and screws and the like may be used to mount feeder on a fixture or support in a desired area. Feeder 12 is located at an elevation that is normally not accessible to animal 21.

Wheel 14 is a generally circular disc member having a plurality of outwardly extended radial spaced T-shaped teeth or arms 16. The wheel 14 is a one peice plastic member made from semi-rigid foam plastic. The material of the wheel 12 is compatible with food 22 and can be cleaned in a conventional manner. As shown in FIG. 2, teeth 16 have arcuate outer peripheral edges. Each tooth has a pair of oppositely extended flanges or ears 17 that are spaced from each other to form a mouth 18A leading into a generally oval shaped pocket or recess 18. The inner edges of flanges 17 and the side edges of teeth 16 are rounded to define generally oval shaped pockets 18. As shown in FIGS. 2 and 4, the opposite sides of the pockets 18 are open to accommodate food 22 having a dimension larger than the width of the pockets 18.

Pockets 18 are adopted to accommodate one or more articles of food 22, as shown in broken lines FIG. 2. Food 22 can be placed in each of the pockets 18 or every other pocket or other positions as selected by the animal husbantrist. Food 22 is dispensed from wheel 14 as the lower pocket approaches the bottom of the wheel. In other words when the pocket 18 is moved to the 6-o'clock position as indicated by arrow 50 in FIG. 2, food 22 will drop to the feeding location where it is available to animal 21.

Referring to FIG. 5, wheel 14 has a central bore 19 that accommodates a generally square sleeve 44. Sleeve 44 has a circular hole extended there through accommodating an elongated drive shaft 41. Shaft 41 as a threaded section 45 terminating in a threaded end 46. A first nut 53 threaded on shaft section 45 and a cap nut 47 threaded on end 46 of shaft 41 clamps wheel 14 between washers 54 and 56. This holds wheel on drive shaft 41 and prevents wheel 14 from rotating with respect to shaft. Cap nut 47 can be removed from end 46 to allow the wheel 14 to be removed from shaft 41 for replacement, cleaning and repair. Other types of wheels can be placed on shaft 41 to alter the feeding cycle or the type of food that is dispened to the animal.

Wheel 14 is rotated in the direction of arrow 52, as shown in FIG. 2, with use of a small electric motor 22 mounted the inside wall of housing 29, as shown in FIG. 5. Motor 26 is a small DC electric motor operably connected to a DC battery 27 located within housing 29 with a pair of conductors or line 38 and 39. A on/off switch 28 is interposed in the electrical circuit to control the operation of motor 26. Switch 28 has a manually operated push button or actuator 28A which allows the user to manually turn the feeder on and off.

Figure 7:
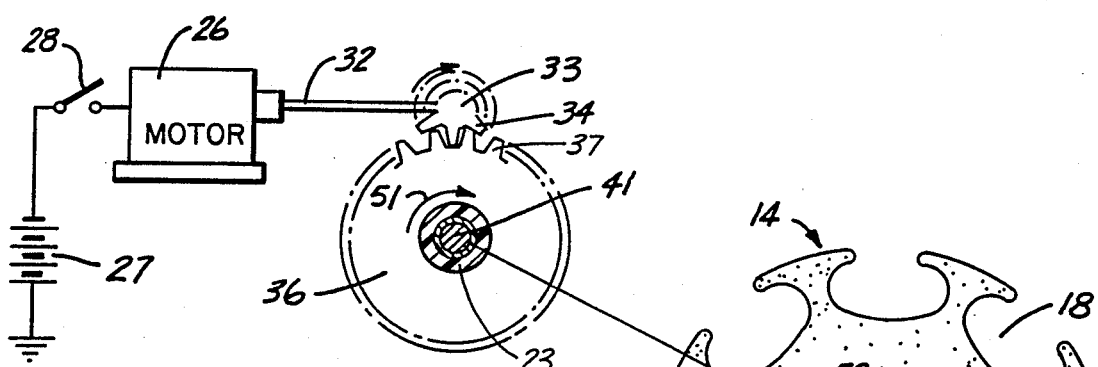
FIG. 7 is a diagramatic view of the mechanical drive for the feeding wheel.

Motor 26 has a conventional drive shaft 32 that accommodates a small drive spur gear 33. As shown in FIG. 7, gear 33 has a plurality of teeth 34 that cooperates with teeth 37 of a driven spur gear 36 secured to the inner end of shaft 41. Shaft 41 extends through a bore 43 in an inwardly directed hub or sleeve 23 on the inside of housing 29. Hub 23 is a bearing support for shaft 41. Gears 33 and 36 form a gear train that substantially reduces the speed of drive shaft 41 whereby, preferably, shaft 41 has one revolution in twelve hours. A ring 42 secured to the center of gear 36 accommodates the inner end of shaft 41 to drivably couple the shaft 41 to gear 36. Other means can be used to attached gear 36 to shaft 41. The motor 26 and gear train 33 and 36 operates to rotate shaft 41 in a clockwise direction as indicated by arrows 51 and 52 of FIG. 7.

In use, feeder 12 is mounted on a suitable support, such as a refrigerator 11, above the feeding location such as the floor in front of the refrigerator. Magnets 31 retain feeder 12 on the refrigerator door. One or more pet treats or food products 22 are placed in desired pattern in pockets 18 of wheel 14. Actuator switch 28A is then pushed inwardly to an on position to close the electrical circuit between battery 27 and motor 26 thereby energizing the motor. Motor 26 operates to rotate drive gear 33 in a relatively slow rate of speed whereby driven gear 36 and the elongated shaft 41 are rotated in a clockwise direction at a comparable slower rate of speed. This causes wheel 14 to rotate in a clockwise direction at a slow rate of approximately the hour hand of a clock. Food product 22 located in a pocket 18 moves downwardly and will eventually drop from wheel 14 when a pocket 18 accommodating food 22 is in the bottom of lowermost portion of the wheel or the 6 o'clock position. The interval between food drops is determined by the circumferential placement of the food products in pockets 18 and the rate of rotation wheel 14. Thus, feeding of pet animal 22 can be accomplished at a selected time intervals without human supervision or attendance.

Figure 9:
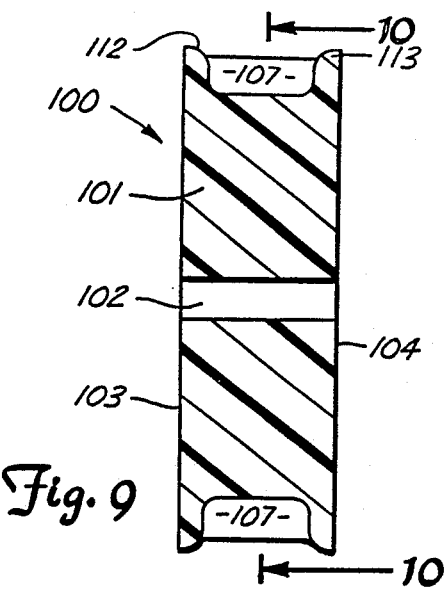
FIG. 9 is a sectional view taken along the line 9—9 of FIG. 8.
Figure 8:
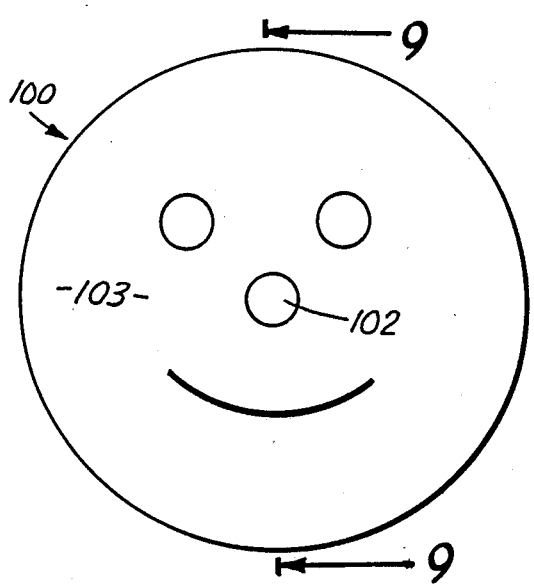
FIG. 8 is a front view of a modified feeding wheel usable with the feeder of FIG. 1.
Figure 10:
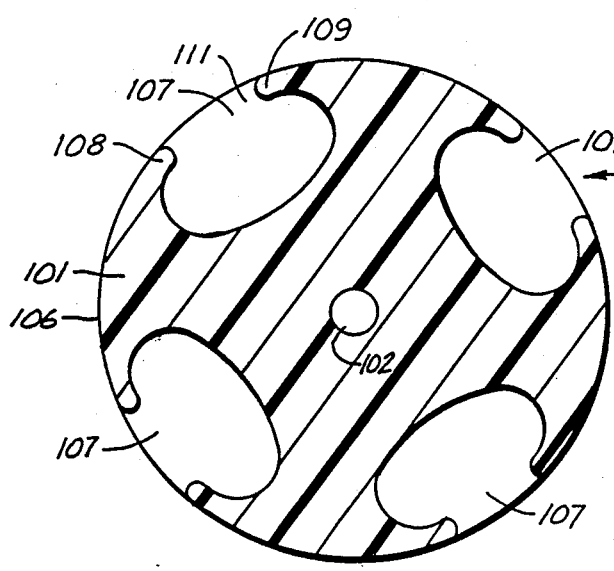
FIG. 10 is a sectional view taken along the line 10—10 of FIG. 9.

Referring to FIGS. 8, 9, and 10, there is shown a modification of a food dispensing wheel indicated generally at 100 usable with feeder 10. Wheel 100 has a generally circular body 101 made of foam plastic material. Other types of materials can be used to form body 101. The mid-section of body 101 has a cylindrical hole 102 for accommodating shaft 41. The hole has a diameter slightly smaller than shaft 41 whereby the shaft can be located with a friction or tight fit on shaft 41. The cap nut 47 along with the washers 54 and 56 opposite sides of the wheel 100 used to secure the wheel to shaft 41.

Dispensing wheel 100 has a generally flat front face 103 that can be used to accommodate congenial indicia or pictorial matter. The opposite side of wheel 100 has a similar face 104 so that the wheel 100 can be placed on shaft in reverse position. The wheel 100 has an outer cylindrical rim 106 that has a plurality of circumferentially spaced pockets 107. FIG. 10 shows the wheel as having four pockets. The wheel can have additional pockets such as the eight pockets shown in FIG. 2. Each pocket is partially enclosed with an inwardly directed flanges or lips 108 and 109. The lips 108 and 109 are separated from each other providing an exit opening or mouth 111 leading into pocket 107. The sides of the pockets 107 are closed with side walls 112 and 113, as shown in FIG. 9. Pockets 107 can hold food, such as granular materials and pellets that can be automatically and periodically dispensed to a feeding location on operation of the electric motor 26.

While there has been shown and described preferred embodiments of the feeder of the invention and its use, it is understood that changes in the structure, materials, arrangement of structures and of the use of the feeder may be made by those skilled in the art without departing from the invention. The invention is defined in the following claims.

I claim:

1. An apparatus for feeding food to an animal comprising: a base mountable on a support, the base comprising a housing having an internal chamber, a shaft rotatably mounted on the housing having an end projected away from the housing, said housing having a boss providing a bearing support for the shaft, wheel means mounted on the shaft for rotation with said shaft, said wheel means having a plurality of pockets open to outer portions of the wheel means for holding food, said wheel means having oppositely extending flanges located partly over each pocket to restrict the size of the opening to each pocket, and drive means mounted on the housing for rotating the wheel means whereby on rotation of the wheel means food in a pocket facing in a downward direction will fall from the downwardly facing pocket to a feeding location.

2. The apparatus of claim 1 wherein: the drive means includes an electric motor and power transmitting means operably connecting the motor to the shaft located within said chamber, and an electric power supply located with said chamber and connected to said electric motor whereby operation of the electric motor rotates the shaft and turns the wheel means.

3. The apparatus of claim 2 including: switch means connecting the power supply to the electric motor operable to selectively connect and disconnect the power supply with the electric motor, the switch means moveable to a first on position to activate the electric motor, the switch means remaining in the first on position until manually moved to a second off position.

4. The apparatus of claim 1 including: magnet means mounted on the housing for holding the apparatus on a metal support.

5. The apparatus of claim 1 including: means releasable mounting the wheel means on the shaft whereby the wheel means can be removed from the shaft.

6. The apparatus of claim 1 wherein: the wheel means is a generally flat circular disk having an outer peripherial edge, said pockets being circumferentially spaced and open to the outer peripherial edge of the disk.

7. The apparatus of claim 6 wherein: the wheel means is a one piece foamed plastic member.

8. The apparatus of claim 6 wherein: said disk has side walls adjacent opposite sides of each pocket.

9. An apparatus for feeding dry food to an animal comprising: a housing having a top wall, a front wall, an interior chamber, and a rear wall, said front wall having a boss projected into the chamber, said boss having a generally horizontal bore, a shaft means extended through said bore rotatably mounted on the boss, motor means located within said chamber having a motor drive shaft, the motor means comprising an electric motor and an electric power source connected to said electric motor, said electric motor and power source being located within said interior chamber, switch means mounted on the top wall of the housing to selectively connect and disconnect the power source with the electric motor, the switch means moveable to a first on position to activate the electric motor, the switch means remaining in the first on position until manually moved to a second off position, power transmitting means connecting the motor drive shaft with the shaft means operable to rotate the shaft means at a relatively slow rate of speed upon operation of the electric motor, a food dispensing wheel mounted on the shaft means for rotation with said shaft means, said wheel having an outer peripherial surface and a plurality of circumferentially spaced pockets open to said outer peripherial surface, said pockets being of a size to accommodate dry animal food whereby on rotation of said shaft means on operation of the electric motor the wheel rotates moving the pockets in a circular path so that food retained in the pockets will fall from the lowermost pocket to a feeding location.

10. The apparatus of claim 9 wherein: said rear wall of the housing has means to hold the apparatus on a support.

11. The apparatus of claim 10 wherein: said means to hold the apparatus on a support include magnet means mounted on said back wall.

12. The apparatus of claim 9 wherein: said wheel has oppositely extending flanges located partly over each pocket to restrict the size of the opening to each pocket.

13. The apparatus of claim 12 wherein: said wheel has side walls adjacent opposite sides of each pocket.

14. The apparatus of claim 12 wherein: the wheel is a one piece foamed plastic disk.

15. The apparatus of claim 14 wherein: said wheel has a central hole accommodating the shaft means, and means releasably mounting the wheel on the shaft means.

16. An apparatus for feeding food to an animal comprising: a housing having an interior chamber, said housing having a boss projected into the chamber, said boss having a generally horizontal bore, a shaft extended through the bore rotatably mounted on the boss, an electric motor connected to an electric power source, the electric motor and power source being located within the chamber, the electric motor having a motor drive shaft, power transmitting means connecting the motor drive shaft with the shaft operable to rotate the shaft at a constant relatively slow rate of speed upon operation of the electric motor, switch means mounted on the housing operable to selectively connect and disconnect the power source with the electric motor, the switch means moveable to a first on position to connect the power source with the electric motor thereby energizing the motor, the switch means remaining in the first on position until manually moved to a second off position, a food dispensing disk mounted on the shaft for rotation with the shaft, the disk having an outer peripheral edge and a plurality of circumferentially spaced pockets open to the outer peripheral edge for holding animal food, the disk having a plurality of radial spaced teeth with oppositely extending flanges located partly over each pocket to form a mouth restricting the size of the opening of each pocket whereby on rotation of the shaft on operation of the electric motor the disk rotates moving the pockets in a circular path so that food retained in the pockets will fall from the lowermost pocket to a feeding location.

17. The apparatus of claim 16 wherein: the housing has means to hold the apparatus on a support whereby the disk is located in a generally vertical plane.

18. The apparatus of claim 16 wherein: the disk has side walls adjacent opposite sides of each pocket and inner edges of each flange.

* * * * *